United States Patent
Hu et al.

(10) Patent No.: US 9,923,367 B2
(45) Date of Patent: Mar. 20, 2018

(54) ANTI-ISLANDING METHOD FOR DISTRIBUTED GENERATOR IN DIRECT CURRENT DISTRIBUTION GRID AND ANTI-ISLANDING DEVICE THEREFOR

(71) Applicants: State Grid Hebei Electric Power Research Institute, Shijiazhuang, Hebei (CN); Hebei Electric Power Commissioning Institute, Shijiazhuang, Hebei (CN)

(72) Inventors: Wenping Hu, Hebei (CN); Jie Guo, Hebei (CN); Lei Wang, Hebei (CN); Xiaobo Duan, Hebei (CN)

(73) Assignees: State Grid Heibei Electic Power Research Institute, Shijiazhuang, Hebei (CN); Hebei Electric Power Commissioning Institute, Shijiazhuang, Hebei (CN)

( * ) Notice: Subject to any disclaimer, the term of this patent is extended or adjusted under 35 U.S.C. 154(b) by 297 days.

(21) Appl. No.: 14/866,984

(22) Filed: Sep. 27, 2015

(65) Prior Publication Data
US 2016/0285263 A1 Sep. 29, 2016

(30) Foreign Application Priority Data
Mar. 26, 2015 (CN) .......................... 2015 1 0136382

(51) Int. Cl.
*H02J 1/10* (2006.01)
*H02J 3/38* (2006.01)
(Continued)

(52) U.S. Cl.
CPC .......... *H02J 1/00* (2013.01); *H02J 1/06* (2013.01); *H02J 3/08* (2013.01); *H02H 7/122* (2013.01)

(58) Field of Classification Search
CPC ........ H02J 3/42; H02J 3/38; H02J 3/00; H02J 9/061; H02J 1/10; G06F 1/26; G06F 1/28; G01R 21/00; G01R 21/02; H02P 1/46
See application file for complete search history.

(56) References Cited

U.S. PATENT DOCUMENTS

| 8,896,330 B2 | 11/2014 | Barnes et al. |
| 2006/0004531 A1* | 1/2006 | Ye .................... G01R 19/2513 702/60 |

(Continued)

FOREIGN PATENT DOCUMENTS

| CN | 101867171 A | 10/2010 |
| CN | 102025155 A | 4/2011 |

(Continued)

OTHER PUBLICATIONS

Yuan Ling et al., "Analysis and Improvement of Islanding Detection Method for Grid-connected Photovoltaic Inverters," Automation of Electric Power Systems, China Academic Journal Electronic Publishing House, vol. 31, No. 21, Nov. 10, 2007 (5 pages).

(Continued)

*Primary Examiner* — Rexford Barnie
*Assistant Examiner* — Jagdeep Dhillon
(74) *Attorney, Agent, or Firm* — Faegre Baker Daniels LLP

(57) ABSTRACT

Provided are an anti-islanding method for a distributed generator in a direct current distribution grid and an anti-islanding device therefor. The method includes: feeding an alternating voltage component into an output end of the AC/DC interface transverter, a frequency of the alternating voltage component being less than the power frequency; sampling a first voltage signal of an output end of the DC/DC transverter; extracting a first effective value of an alternating signal included in the first voltage signal; comparing the first effective value with a first preset voltage; and controlling the distributed generator to stop operation, in a case that it is determined that the first effective value is less than the first preset voltage, which indicates that islanding occurs for the distributed generator.

10 Claims, 3 Drawing Sheets

(51) Int. Cl.
*H02J 7/34* (2006.01)
*H02J 1/00* (2006.01)
*H02J 3/08* (2006.01)
*H02J 1/06* (2006.01)
*H02H 7/122* (2006.01)

(56) References Cited

U.S. PATENT DOCUMENTS

| | | | | |
|---|---|---|---|---|
| 2011/0309684 | A1* | 12/2011 | Song | H02J 3/383 307/87 |
| 2013/0058139 | A1* | 3/2013 | Bae | H02H 3/38 363/55 |
| 2014/0214230 | A1* | 7/2014 | Gurudasani | H02J 3/00 700/297 |

FOREIGN PATENT DOCUMENTS

| | | |
|---|---|---|
| CN | 103078325 A | 5/2013 |
| CN | 103296643 A | 9/2013 |
| CN | 104378066 A | 5/2015 |
| WO | WO2012166933 A1 | 12/2012 |

OTHER PUBLICATIONS

First Office Action regarding CN2015101368382.5, Anti-Islanding Method for Distributed Generator in Direct Current Distribution Grid and Anti-Islanding Device Therefor, dated Jan. 29, 2018 by State Intellectual Property Office of China (8 pages).

\* cited by examiner

US 9,923,367 B2

ANTI-ISLANDING METHOD FOR DISTRIBUTED GENERATOR IN DIRECT CURRENT DISTRIBUTION GRID AND ANTI-ISLANDING DEVICE THEREFOR

CROSS REFERENCE TO RELATED APPLICATIONS

The present application claims the priority of Chinese Patent Application No. 201510136382.5, entitled "ANTI-ISLANDING METHOD FOR DISTRIBUTED GENERATOR IN DIRECT CURRENT DISTRIBUTION GRID AND ANTI-ISLANDING DEVICE THEREFOR", filed on Mar. 26, 2015 with the State Intellectual Property Office of People's Republic of China, the content of which is incorporated herein by reference.

FIELD

The disclosure relates to the technical field of direct current distribution grids, and particularly, to an anti-islanding method for a distributed generator in a direct current distribution grid and an anti-islanding device therefor.

BACKGROUND

With the gradual exhaustion of conventional fossil energy and increasingly serious problems of global climate change and environment pollution, a clean, low carbon and sustainable green energy is to be urgently exploited, to satisfy increasing energy demand of human society and ease environmental burden. Distributed photovoltaic power generation in distributed generators is an effective way of using solar energy with a high conversion efficiency, is beneficial for making full use of resource, and improves reliability of energy supply.

Direct current distribution grids are a new development direction for distribution grids in the future, and draw wide attention in academia in recent years, and demonstration projects of the direct current distribution grids are put into application. The direct current distribution grid has advantages of flexible and open, and the inversion step for accessing a direct current generator such as a photovoltaic generator is cancelled. Therefore, the cost for accessing the distributed generator into the distribution grid is reduced greatly, and a large number of the distributed generators can be accessed.

Similar to an alternating current access, there is an anti-islanding technical problem for the distributed photovoltaic generator accessed into the direct current distribution grid. FIG. 1 is a schematic diagram showing that a distributed generator is accessed into a direct current distribution grid.

FIG. 1 shows a two-end direct current distribution grid, in which the power systems at the two ends are an alternating current system 1 and an alternating current system 2 respectively, the alternating current system 1 is connected to the direct current distribution grid through a first AC/DC interface transverter 100a, the alternating current system 2 is connected to the direct current distribution grid through a second AC/DC interface transverter 100b, a distributed generator 300 is connected to the direct current distribution grid through a grid-connected DC/DC transverter 200 and a breaker 400; and a local load 500, other load 600 and other generator 700 are also connected into the direct current distribution grid.

It should be prevented that in a case that the distribution grid stops operation, the distributed generator 300 cannot quit operation as scheduled, but continues to power the local load 500, which forms an unscheduled power island in the distribution grid stopping operation. Particularly, in a case that output power of the distributed generator 500 is basically the same as that of the local load 500, an island with relatively stable power is formed, thereby causing a non-detection zone.

The islanding results in hazards that the stability of power supply of the island and the quality of the electric energy cannot be ensured, the island with electricity affects a low-voltage recloser, and threatens personal safety and device safety in repairing, and disputes for rights and liabilities of power supply are likely caused. Different from an alternating current distribution grid, in the direct current distribution grid, abnormal frequency cannot be detected, and an active frequency shift cannot be performed to avoid the non-detection zone, hence, it is more difficult to prevent the islanding.

Therefore, it is necessary for those skilled in the art to provide an anti-islanding method for a distributed generator in a direct current distribution grid and an anti-islanding device therefor, which can accurately and timely detect whether the islanding occurs for the distributed generator, and control the distributed generator to stop operation in a case of the islanding.

SUMMARY

The object of the disclosure is to provide an anti-islanding method for a distributed generator in a direct current distribution grid and an anti-islanding device therefor, which can accurately and timely detect whether islanding occurs for the distributed generator, and control the distributed generator to stop operation in a case of the islanding.

The anti-islanding method for a distributed generator in a direct current distribution grid is provided according to an embodiment of the disclosure, which is applied to a direct current distribution grid. The distributed generator is connected to an input end of a DC/DC transverter, an output end of the DC/DC transverter is connected to the direct current distribution grid through a grid-connected direct current breaker; and an alternating current system is connected to an input end of an AC/DC interface transverter, and an output end of the AC/DC interface transverter is connected to the direct current distribution grid. The method includes:

feeding an alternating voltage component into the output end of the AC/DC interface transverter, a frequency of the alternating voltage component being less than the power frequency;

sampling a first voltage signal of the output end of the DC/DC transverter;

extracting a first effective value of an alternating signal included in the first voltage signal;

comparing the first effective value with a first preset voltage; and controlling the distributed generator to stop operation, in a case that it is determined that the first effective value is less than the first preset voltage, which indicates that islanding occurs for the distributed generator.

Preferably, the direct current distribution grid is a single-end distribution grid or a two-end distribution grid.

Preferably, in a case that the direct current distribution grid is the two-end distribution grid, the direct current distribution grid includes two AC/DC interface transverters, namely a first AC/DC interface transverter and a second AC/DC interface transverter respectively, a first alternating current system is connected to the direct current distribution grid through the first AC/DC interface transverter, and a second alternating current system is connected to the direct current distribution grid through the second AC/DC interface transverter; and the process of feeding an alternating voltage component into the output end of the AC/DC interface transverter includes:

feeding the alternating voltage component into an output end of any one of the two AC/DC interface transverters, in a case that it is determined that both of the two AC/DC interface transverters operate normally; and feeding the alternating voltage component into an output end of one of the two AC/DC interface transverters which operates normally, in a case that it is determined that one of the two AC/DC interface transverters fails.

Preferably, the process of determining that the AC/DC interface transverter fails includes:

sampling a second voltage signal of the output end of the AC/DC interface transverter;

extracting a second effective value of an alternating signal included in the second voltage signal;

comparing the second effective value with a second preset voltage; and determining that the AC/DC interface transverter fails, in a case that it is determined that the second effective value is less than the second preset voltage.

Preferably, the alternating voltage component $u_{ac}^*$ is expressed as $$u_{ac}^* = kU_{dc}\sin(2\pi f_{ac}t),$$

where $U_{dc}$ is a rated direct voltage; k is a percentage of the fed alternating voltage component; and $f_{ac}$ is the frequency of the alternating voltage component, where k is in a range between 2% and 5% and $f_{ac}$ is in a range between 10% of the power frequency and 60% of the power frequency.

Preferably, the first preset voltage is equal to the second preset voltage, as $U_{set}$; and $U_{set}$ is in a range between 5% of $kU_{dc}$ and 20% of $kU_{dc}$.

An anti-islanding device for a distributed generator in a direct current distribution grid is provided according to an embodiment of the disclosure, which is applied to a direct current distribution grid. The distributed generator is connected to an input end of a DC/DC transverter, an output end of the DC/DC transverter is connected to the direct current distribution grid through a grid-connected direct current breaker; and an alternating current system is connected to an input end of an AC/DC interface transverter, and an output end of the AC/DC interface transverter is connected to the direct current distribution grid. The device includes:

an alternating voltage component feeding unit configured to feed an alternating voltage component into the output end of the AC/DC interface transverter, a frequency of the alternating voltage component being less than the power frequency;

a first voltage signal sampling unit configured to sample a first voltage signal of the output end of the DC/DC transverter;

a first effective value extracting unit configured to extract a first effective value of an alternating signal included in the first voltage signal;

a first comparison unit configured to compare the first effective value with a first preset voltage; and a control unit configured to control the distributed generator to stop operation, in a case that it is determined that the first effective value is less than the first preset voltage, which indicates that islanding occurs for the distributed generator.

Preferably, the direct current distribution grid is a single-end distribution grid or a two-end distribution grid.

In a case that the direct current distribution grid is the two-end distribution grid, the direct current distribution grid includes two AC/DC interface transverters, nemaly a first AC/DC interface transverter and a second AC/DC interface transverter. A first alternating current system is connected to the direct current distribution grid through the first AC/DC interface transverter, and a second alternating current system is connected to the direct current distribution grid through the second AC/DC interface transverter. The device further includes a malfunction determination unit.

The alternating voltage component feeding unit feeds the alternating voltage component into an output end of any one of the two AC/DC interface transverters, in a case that the malfunction determination unit determines that both of the two AC/DC interface transverters operate normally.

The alternating voltage component feeding unit feeds the alternating voltage component into an output end of one of the two AC/DC interface transverters which operates normally, in a case that the malfunction determination unit determines that one of the two AC/DC interface transverters fails.

Preferably, the malfunction determination unit includes:

a second voltage signal sampling subunit configured to sample a second voltage signal of the output end of the AC/DC interface transverter;

a second effective value extracting subunit configured to extract a second effective value of an alternating signal included in the second voltage signal;

a comparison subunit configured to compare the second effective value with a second preset voltage; and a determination subunit configured to determine that the AC/DC interface transverter fails, in a case that it is determined that the second effective value is less than the second preset voltage.

Preferably, the alternating voltage component $u_{ac}^*$ is expressed as $$u_{ac}^* = kU_{dc}\sin(2\pi f_{ac}t),$$

where $U_{dc}$ is a rated direct voltage; k is a percentage of the fed alternating voltage component; and $f_{ac}$ is the frequency of the alternating voltage component, where k is in a range between 2% and 5% and $f_{ac}$ is in a range between 10% of the power frequency and 60% of the power frequency;

the first preset voltage is equal to the second preset voltage, as $U_{set}$; and $U_{set}$ is in a range between 5% of $kU_{dc}$ and 20% of $kU_{dc}$.

Compared with conventional technology, the disclosure has following advantages.

In the anti-islanding method according to the embodiment, the alternating voltage component is fed into the output end of the AC/DC interface transverter, it is detected whether there is the alternating voltage component at the output end of the DC/DC transverter to determine whether the distributed generator needs to stop operation. If there is no alternating voltage component at the output end of the DC/DC transverter, the distributed generator is controlled to stop operation, thereby preventing the islanding occurring for the distributed generator and the local load. The method according to the embodiment may be simply implemented, and can accurately determine whether the islanding occurs in a timely manner.

BRIEF DESCRIPTION OF THE DRAWINGS

In order to illustrate technical solutions according to embodiments of the disclosure or in the conventional technology more clearly, the drawings to be used in the description of the conventional technology or the embodiments are described briefly hereinafter. Apparently, the drawings described hereinafter are only for some embodiments of the present disclosure, and other drawings may be obtained by those skilled in the art according to those drawings without creative effort.

DETAILED DESCRIPTION

Hereinafter, technical solutions in embodiments of the disclosure are described clearly and completely in conjunction with the drawings of the embodiments of the disclosure. It is apparent that the described embodiments are only a part of embodiments of the present disclosure. Other embodiments obtained by those skilled in the art on the basis of the embodiments of the present disclosure without creative work fall into the scope of protection of the present disclosure.

To make the object, features and advantages more apparently and understandably, the embodiments of the disclosure are described in detail in conjunction with drawings hereinafter.

First Method Embodiment

Figure 2:
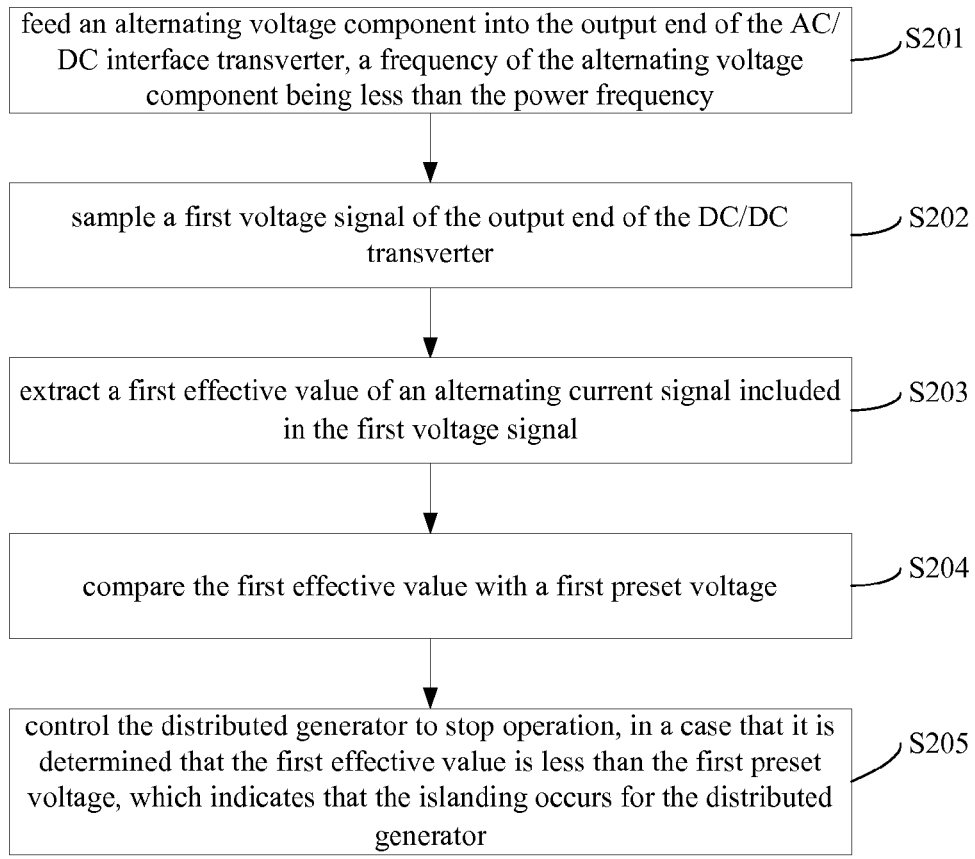
FIG. 2 is a flow chart of an anti-islanding method for a distributed generator in a direct current distribution grid according to a first method embodiment of the disclosure.

FIG. 2 is a flow chart of an anti-islanding method for a distributed generator in a direct current distribution grid according to a first method embodiment of the disclosure.

The anti-islanding method for a distributed generator in a direct current distribution grid according to the embodiment is applied to a direct current distribution grid, the distributed generator is connected to an input end of a DC/DC transverter, an output end of the DC/DC transverter is connected to the direct current distribution grid through a grid-connected direct current breaker; and an alternating current system is connected to an input end of an AC/DC interface transverter, and an output end of the AC/DC interface transverter is connected to the direct current distribution grid. The method includes steps S201 to S205.

In step S201, an alternating voltage component is fed into the output end of the AC/DC interface transverter, and the frequency of the alternating voltage component is less than the power frequency.

For example, the power frequency of the alternating current system connected to the direct current distribution grid is 50 Hz, and the frequency of the alternating voltage component is less than 50 Hz, for example, 10 Hz.

The frequency of the alternating voltage component is set to be less than the power frequency due to the fact as follows.

The alternating voltage component with the frequency less than the power frequency is unlikely generated by other causes in the direct current distribution grid, the alternating voltage component has a long transmission distance and small interference on the direct current distribution grid, and it is convenient for voltage stability control of the DC/DC transverter connected to the photovoltaic generator. However, in a case of the frequency of the alternating voltage component is too low, too much latency time is taken in calculating a first effective value. Therefore, the selectable frequency of the alternating voltage component is in a range between 10% of the power frequency and 60% of the power frequency.

Furthermore, the crosstalk between an interference signal in the alternating current system and the direct current distribution grid, which affects precision for signal detection, is prevented.

In step S202, a first voltage signal of the output end of the DC/DC transverter is sampled.

It can be understood that in a case that the direct current distribution grid operates normally and the grid-connected direct current breaker is turned on, the first voltage signal includes the alternating voltage component.

In step S203, a first effective value of an alternating signal included in the first voltage signal is extracted.

The first voltage signal may include both the direct component and the alternating component, it is determined whether islanding occurs by determining whether the first voltage signal includes the alternating voltage component, and it is needed to extract the alternating voltage component. Specifically, the alternating voltage component may be extracted via a band-pass filter.

In step S204, the first effective value is compared with a first preset voltage.

In step S205, the distributed generator is controlled to stop operation, in a case that it is determined that the first effective value is less than the first preset voltage, which indicates that the islanding occurs for the distributed generator.

It should be noted that, generally, in a case that it is determined that a period of time, in which the first effective value is less than the first preset voltage, is greater than a first preset period of time $T_{set1}$, it is really considered that the first effective value is less than the first preset voltage, since an instantaneous first effective value less than the first preset voltage may be caused by the jitter of the direct current distribution grid.

In a case that it is determined that the first effective value is greater than the first preset voltage, it indicates that there is the fed alternating voltage component at the output end of the DC/DC transverter, and thus indicates that the direct current distribution grid normally operates and the grid-connected direct current breaker is turned on.

In a case that the first effective value is less than the first preset voltage, if the direct current distribution grid stops operation, or the grid-connected direct current breaker is turned off, or the direct current distribution grid stops operation and the grid-connected direct current breaker is turned off, there is no fed alternating voltage component at the output end of the DC/DC transverter. Therefore, in a case that it is determined that the first effective value is less than the first preset voltage, it indicates that the distributed generator needs to stop operation, otherwise, the islanding may occur for the distributed generator together with the local load.

In the anti-islanding method according to the embodiment, the alternating voltage component is fed into the output end of the AC/DC interface transverter, and it is detected whether there is the alternating voltage component at the output end of the DC/DC transverter to determine whether the distributed generator needs to stop operation. If there is no alternating voltage component at the output end of the DC/DC transverter, the distributed generator is controlled to stop operation, thereby avoiding the islanding to occur for the distributed generator and the local load. The method according to the embodiment may be simply implemented, and can accurately determine whether the islanding occurs in a timely manner.

Second Method Embodiment

Figure 3:
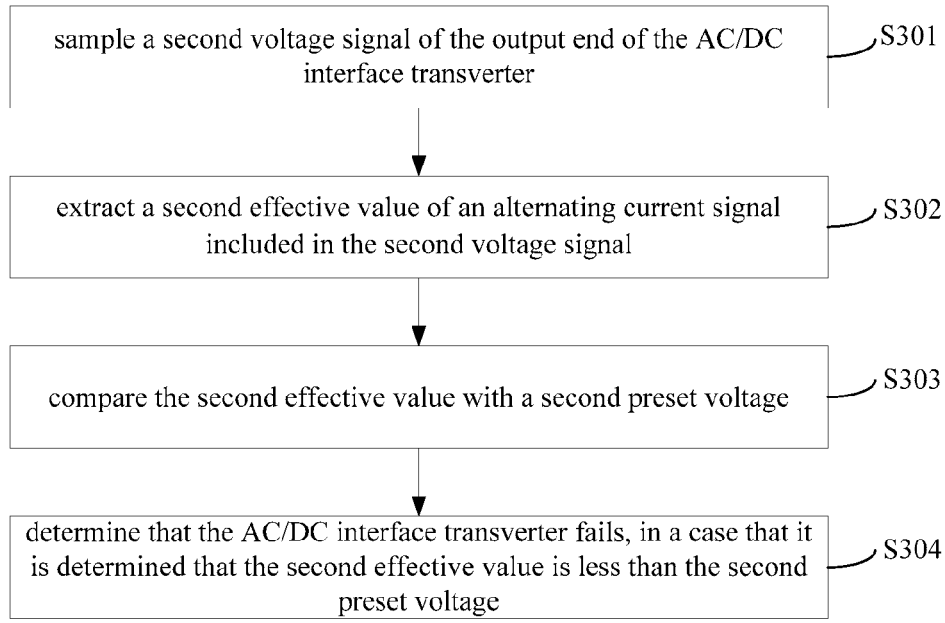
FIG. 3 is a flow chart of an anti-islanding method for a distributed generator in a direct current distribution grid according to a second method embodiment of the disclosure.

FIG. 3 is a flow chart of an anti-islanding method for a distributed generator in a direct current distribution grid according to a second method embodiment of the disclosure.

It should be noted that the direct current distribution grid may be a single-end distribution grid or a two-end distribution grid. The method according to the disclosure not only may be applicable to the case that the direct current distribution grid is the single-end distribution grid, but also may be applicable to the case that the direct current distribution grid is the two-end distribution grid.

The case that the direct current distribution grid is the two-end distribution grid is illustrated below. The direct current distribution grid includes two AC/DC interface transverters, namely a first AC/DC interface transverter and a second AC/DC interface transverter, and a system structure diagram of the direct current distribution grid may refer to FIG. 1. A first alternating current system is connected to the direct current distribution grid through the first AC/DC interface transverter, and a second alternating current system is connected to the direct current distribution grid through the second AC/DC interface transverter.

It should be noted that the AC/DC interface transverter into which an alternating voltage component is fed operates in a master mode, and the other AC/DC interface transverter operates in a slave mode.

The master/slave mode of the AC/DC interface transverters is set to prevent the formation of a loop current between the two interface transverters. In a case that the direct current distribution grid operates normally, the alternating voltage component is fed into only one AC/DC interface transverter, and the alternating voltage component is fed into the transverter in the slave mode if the transverter in the master mode stops operation due to malfunction.

This embodiment differs from the first method embodiment in that, the process of feeding the alternating voltage component into the output end of the AC/DC interface transverter includes:

feeding the alternating voltage component into an output end of any one of the two AC/DC interface transverters, in a case that it is determined that both of the two AC/DC interface transverters operate normally; and feeding the alternating voltage component into an output end of one of the two AC/DC interface transverters which operates normally, in a case that it is determined that one of the two AC/DC interface transverters fails.

The process of determining that the AC/DC interface transverter fails includes steps S301 to S304.

In step S301, a second voltage signal of the output end of the AC/DC interface transverter is sampled.

In step S302, a second effective value of an alternating signal included in the second voltage signal is extracted.

In step S303, the second effective value is compared with a second preset voltage.

In step S304, it is determined that the AC/DC interface transverter fails, in a case that it is determined that the second effective value is less than the second preset voltage.

It should be noted that, generally, in a case that it is determined that a period of time, in which the second effective value is less than the second preset voltage, is greater than a second preset period of time $T_{set1}$, it is really considered that the second effective value is less than the second preset voltage, since an instantaneous second effective value less than the second preset voltage may be caused by the jitter of the direct current distribution grid.

It should be noted that $T_{set1}$ should be less than 2 seconds and be ensured to be less than $T_{set2}$, so that an anti-islanding operation may not be performed by mistake when $u_{ac}^*$ is fed since the AC/DC interface transverter in the master mode and the AC/DC interface transverter in the slave mode are switched.

It should be noted that the first preset voltage is equal to the second preset voltage, as $U_{set}$.

Considering voltage divisions of lines in the direct current distribution grid, $U_{set}$ may be in a range between 5% of $kU_{dc}$ and 20% of $kU_{dc}$.

For example, $U_{set}$ may be 0.5V for a typical ±200V two-end direct current distribution grid.

The alternating voltage component $u_{ac}^*$ is expressed as $$u_{ac}^* = kU_{dc}\sin(2\pi f_{ac}t),$$

where $U_{dc}$ is a rated direct voltage; k is a percentage of the fed alternating voltage component; and $f_{ac}$ is the frequency of the alternating voltage component, where k is in a range between 2% and 5% and $f_{ac}$ is in a range between 10% of the power frequency and 60% of the power frequency.

k should be minimized as far as possible on the premise that grid connection points of the direct current distribution grid can reliably detect the low frequency component, so as to minimize the affection caused by feeding the low frequency voltage, and k is generally in a range between 2% and 5%.

To make those skilled in the art to better understand and implement the disclosure, a simulation diagram is combined below for illustration.

Figure 4:
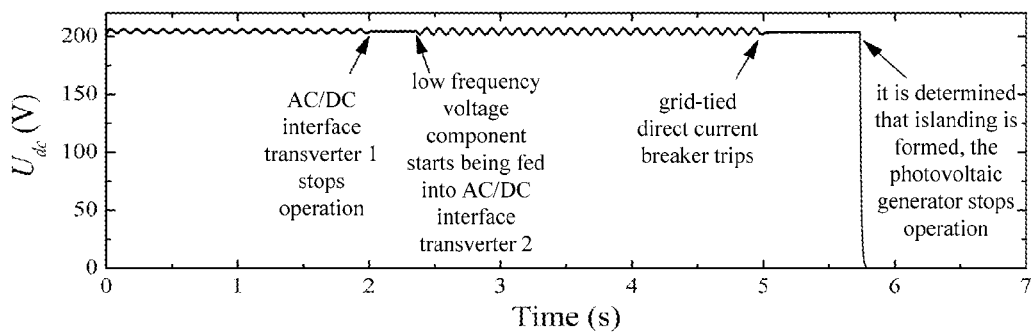
FIG. 4 is a waveform diagram of a positive voltage $U_{dc}$ of an output end of a distributed photovoltaic grid-connected DC/DC transverter according to the disclosure.

FIG. 4 is a waveform diagram of a positive voltage $U_{dc}$ of an output end of a distributed photovoltaic grid-connected DC/DC transverter according to the disclosure.

Figure 1:
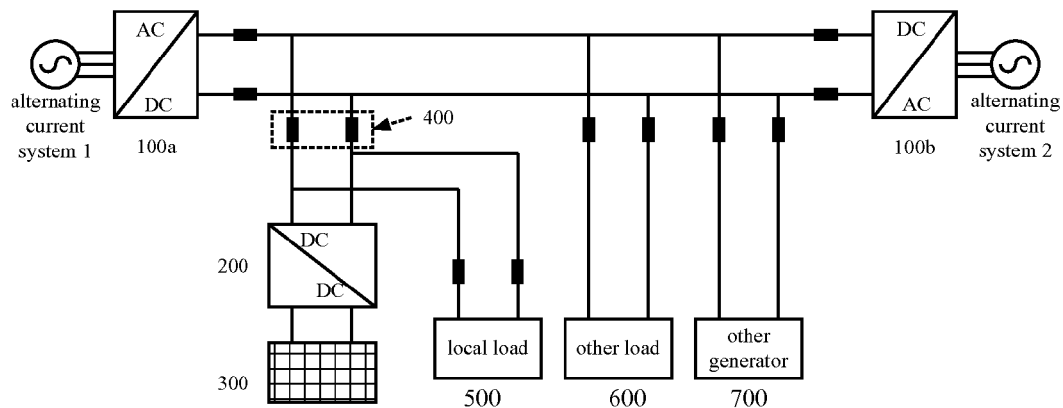
FIG. 1 is a schematic diagram showing that a distributed generator is accessed into a direct current distribution grid in conventional technology.

Combined with FIG. 1, the first AC/DC interface transverter 100a is set to operate in the master mode, and the second AC/DC interface transverter 100b is set to operate in the slave mode. k is 2%, $f_{ac}$ is 10 Hz, $U_{set}$ is 0.5V, $T_{set2}$ is 0.2s, and $T_{set1}$ is 0.5s.

It can be seen from the waveform that once the simulation is performed, a 10 Hz low frequency voltage component is fed into the first AC/DC interface transverter 100a, the first AC/DC interface transverter 100a stops operation and trips at the 2 seconds, after 0.3 seconds, the 10 Hz low frequency voltage component is fed into the second AC/DC interface transverter 100b, instead of the first AC/DC interface transverter 100a, and an anti-islanding operation is not performed by mistake during the switching since the 10 Hz low frequency voltage component is recovered within 0.5 seconds; and the grid-connected direct current breaker is turned off and an island is formed at the 5 second, the DC/DC transverter cannot communicate with the direct current distribution grid at this moment, and the direct component remains unchanged, thereby causing a non-detection zone since the power of the local load is equal to the power of the distributed photovoltaic generator; and the photovoltaic generator stops operation at 0.7 seconds after the tripping since no 10 Hz alternating voltage component is fed into the island.

The simulation result indicates that, with the method according to the embodiment of the disclosure, the photovoltaic island may be quickly and effectively prevented to be generated in the direct current distribution grid, the non-detection zone can be overcome, and the false operation is avoided when the operating mode of the AC/DC interface transverter is switched.

Based on the anti-islanding method for a distributed generator in a direct current distribution grid according to the embodiment, an anti-islanding device for a distributed generator in a direct current distribution grid is further provided according to the disclosure.

First Device Embodiment

Figure 5:
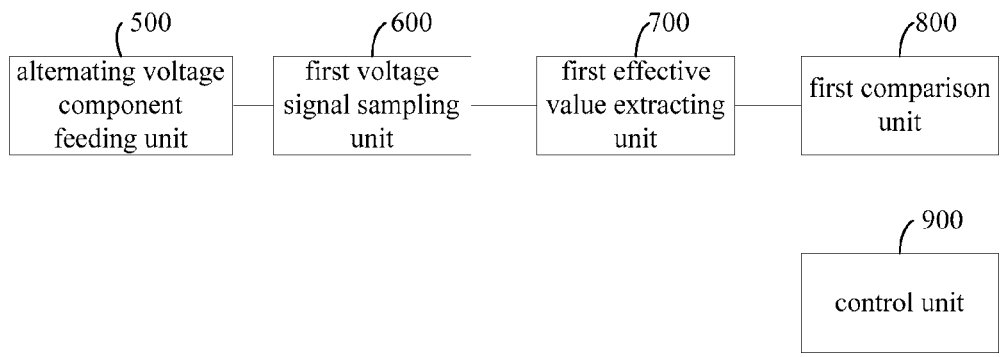
FIG. 5 is a schematic diagram of an anti-islanding device for a distributed generator in a direct current distribution grid according to a first device embodiment of the disclosure.

FIG. 5 is a schematic diagram of an anti-islanding device for a distributed generator in a direct current distribution grid according to a first device embodiment of the disclosure.

The anti-islanding device for a distributed generator in a direct current distribution grid according to the embodiment is applied to a direct current distribution grid, the distributed generator is connected to an input end of a DC/DC transverter, an output end of the DC/DC transverter is connected to the direct current distribution grid through a grid-connected direct current breaker; and an alternating current system is connected to an input end of an AC/DC interface transverter, and an output end of the AC/DC interface transverter is connected to the direct current distribution grid. The device includes an alternating voltage component feeding unit 500, a first voltage signal sampling unit 600, a first effective value extracting unit 700, a first comparison unit 800, and a control unit 900.

The alternating voltage component feeding unit 500 is configured to feed an alternating voltage component into the output end of the AC/DC interface transverter, and the frequency of the alternating voltage component is less than the power frequency.

For example, the power frequency is 50 Hz, and the frequency of the alternating voltage component is less than 50 Hz, for example, 10 Hz.

The frequency of the alternating voltage component is set to be less than the power frequency due to the fact as follows.

The alternating voltage component with the frequency less than the power frequency is unlikely generated by other causes in the direct current distribution grid, the alternating voltage component has a long transmission distance and small interference on the direct current distribution grid, and it is convenient for voltage stability control of the DC/DC transverter connected to the photovoltaic generator. However, in a case of the frequency of the alternating voltage component is too low, too much latency time is taken in calculating a first effective value. Therefore, the selectable frequency of the alternating voltage component is in a range between 10% of the power frequency and 60% of the power frequency.

Furthermore, the crosstalk between an interference signal in the alternating current system and the direct current distribution grid, which affect precision for signal detection, is prevented.

The first voltage signal sampling unit 600 is configured to sample a first voltage signal of the output end of the DC/DC transverter.

It can be understood that in a case that the direct current distribution grid operates normally and the grid-connected direct current breaker is turned on, the first voltage signal includes the alternating voltage component.

The first effective value extracting unit 700 is configured to extract a first effective value of an alternating signal included in the first voltage signal.

The first voltage signal may include both the direct component and the alternating component, it is determined whether islanding occurs by determining whether the first voltage signal includes the alternating voltage component, and it is needed to extract the alternating voltage component. Specifically, the alternating voltage component may be extracted via a band-pass filter.

The first comparison unit 800 is configured to compare the first effective value with a first preset voltage.

The control unit 900 is configured to control the distributed generator to stop operation, in a case that it is determined that the first effective value is less than the first preset voltage, which indicates that the islanding occurs for the distributed generator.

It should be noted that, generally, in a case that it is determined that a period of time, in which the first effective value is less than the first preset voltage, is greater than a first preset period of time $T_{set1}$, it is really considered that the first effective value is less than the first preset voltage, since an instantaneous first effective value less than the first preset voltage may be caused by the jitter of the direct current distribution grid.

In a case that it is determined that the first effective value is greater than the first preset voltage, it indicates that there is the fed alternating voltage component at the output end of the DC/DC transverter, and thus indicates that the direct current distribution grid normally operates and the grid-connected direct current breaker is turned on.

In a case that the first effective value is less than the first preset voltage, if the direct current distribution grid stops operation, or the grid-connected direct current breaker is turned off, or the direct current distribution grid stops operation and the grid-connected direct current breaker is turned off, there is no fed alternating voltage component at the output end of the DC/DC transverter. Therefore, in a case that it is determined that the first effective value is less than the first preset voltage, it indicates that the distributed generator needs to stop operation, otherwise, the islanding may occur for the distributed generator together with the local load.

In the anti-islanding device according to the embodiment, the alternating voltage component is fed into the output end of the AC/DC interface transverter, and it is detected whether there is the alternating voltage component at the output end of the DC/DC transverter to determine whether the distributed generator needs to stop operation. If there is no alternating voltage component at the output end of the DC/DC transverter, the distributed generator is controlled to stop operation, thereby avoiding the islanding to occur for the distributed generator and the local load. The device according to the embodiment may be simply implemented, and can accurately determine whether the islanding occurs in a timely manner.

Second Device Embodiment

Figure 6:
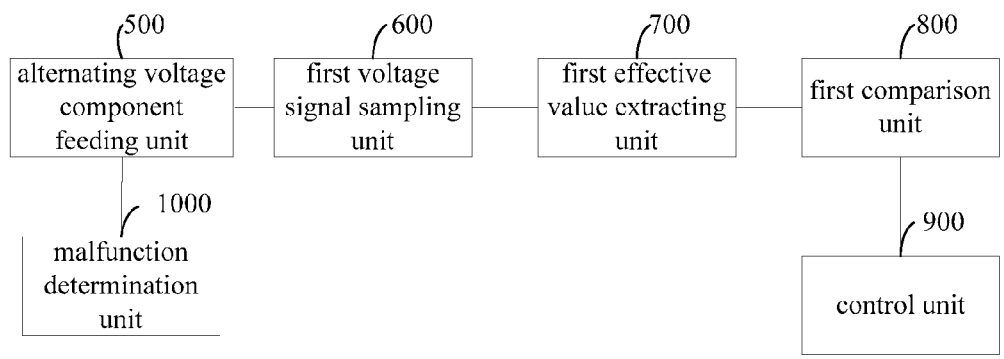
FIG. 6 is a schematic diagram of an anti-islanding device for a distributed generator in a direct current distribution grid according to a second device embodiment of the disclosure.

FIG. 6 is a schematic diagram of an anti-islanding device for a distributed generator in a direct current distribution grid according to a second device embodiment of the disclosure.

It should be noted that the direct current distribution grid may be a single-end distribution grid or a two-end distribution grid. The device according to the disclosure not only may be applicable to the case that the direct current distribution grid is the single-end distribution grid, but also may be applicable to the case that the direct current distribution grid is the two-end distribution grid.

The case that the direct current distribution grid is the two-end distribution grid is illustrated below. The direct current distribution grid includes two AC/DC interface transverters, namely a first AC/DC interface transverter and a second AC/DC interface transverter. A first alternating current system is connected to the direct current distribution grid through the first AC/DC interface transverter, and a second alternating current system is connected to the direct current distribution grid through the second AC/DC interface transverter.

It should be noted that the AC/DC interface transverter into which an alternating voltage component is fed operates in a master mode, and the other AC/DC interface transverter operates in a slave mode.

The master/slave mode of the AC/DC interface transverters is set to prevent the formation of a loop current between the two interface transverters. In a case that the direct current distribution grid operates normally, the alternating voltage component is fed into only one AC/DC interface transverter, and the alternating voltage component is fed into the transverter in the slave mode if the transverter in the master mode stops operation due to malfunction.

The device further includes a malfunction determination unit 1000.

The alternating voltage component feeding unit 500 feeds the alternating voltage component into an output end of any one of the two AC/DC interface transverters, in a case that the malfunction determination unit 1000 determines that both of the two AC/DC interface transverters operate normally.

The alternating voltage component feeding unit 500 feeds the alternating voltage component into an output end of one of the two AC/DC interface transverters which operates normally, in a case that the malfunction determination unit 1000 determines that one of the two AC/DC interface transverters fails.

Third Device Embodiment

Figure 7:
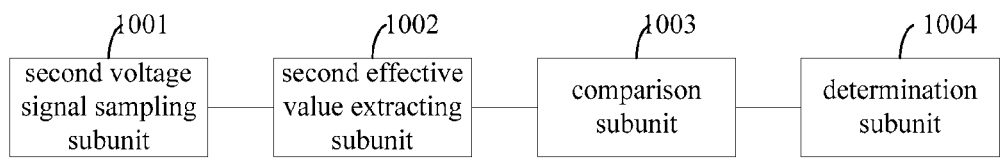
FIG. 7 is a schematic structural diagram of a malfunction determination unit according to the disclosure.

FIG. 7 is a schematic structural diagram of a malfunction determination unit according to the disclosure.

The malfunction determination unit includes:

a second voltage signal sampling subunit 1001 configured to sample a second voltage signal of the output end of the AC/DC interface transverter;

a second effective value extracting subunit 1002 configured to extract a second effective value of an alternating signal included in the second voltage signal;

a comparison subunit 1003 configured to compare the second effective value with a second preset voltage; and a determination subunit 1004 configured to determine that the AC/DC interface transverter fails, in a case that it is determined that the second effective value is less than the second preset voltage.

It should be noted that, generally, in a case that it is determined that a period of time, in which the second effective value is less than the second preset voltage, is greater than a second preset period of time $T_{set2}$, it is really considered that the second effective value is less than the second preset voltage, since an instantaneous second effective value less than the second preset voltage may be caused by the jitter of the direct current distribution grid.

It should be noted that $T_{set1}$ should be less than 2 seconds, and it is ensured that $T_{set1}$ is less than $T_{set2}$, so that an anti-islanding operation may not be performed by mistake in a case that $u_{ac}^*$ is fed into the AC/DC interface transverter due to the switching between the master mode and the slave mode.

It should be noted that the first preset voltage is equal to the second preset voltage, as $U_{set}$.

Considering voltage divisions of lines in the direct current distribution grid, $U_{set}$ may be in a range between 5% of $kU_{dc}$ and 20% of $kU_{dc}$.

For example, $U_{set}$ may be 0.5V for a typical ±200V two-end direct current distribution grid.

The alternating voltage component $u_{ac}^*$ is expressed as $$u_{ac}^* = kU_{dc}\sin(2\pi f_{ac}t),$$

where $U_{dc}$ is a rated direct voltage; k is a percentage of the fed alternating voltage component; and $f_{ac}$ is the frequency of the alternating voltage component, where k is in a range between 2% and 5% and $f_{ac}$ is in a range between 10% of the power frequency and 60% of the power frequency.

k should be minimized as far as possible on the premise that grid connection points of the direct current distribution grid can reliably detect the alternating voltage component, so as to minimize the affection caused by feeding the alternating voltage component, and k is generally in a range between 2% and 5%.

The foregoing embodiments are only preferred embodiments of the disclosure and are not intended to limit the disclosure. The preferred embodiments according to the disclosure are disclosed above, which are not interpreted as limiting the disclosure. Numerous alternations, modifications, and equivalents can be made to the technical solutions of the present disclosure by those skilled in the art in light of the methods and technical content disclosed herein without departing from the scope of the technical solutions of the disclosure. Therefore, any alternations, modifications, and equivalents made to the embodiments above according to the technical essential of the present disclosure without deviation from the scope of the present disclosure should fall into the scope of the technical solutions of the disclosure.

The invention claimed is:

1. An anti-islanding method for a distributed generator in a direct current distribution grid, wherein the method is applied to a direct current distribution grid, the distributed generator is connected to an input end of a DC/DC transverter, an output end of the DC/DC transverter is connected to the direct current distribution grid through a grid-connected direct current breaker; and an alternating current system is connected to an input end of an AC/DC interface transverter, and an output end of the AC/DC interface transverter is connected to the direct current distribution grid; and the method comprises:

feeding an alternating voltage component into the output end of the AC/DC interface transverter, a frequency of the alternating voltage component being less than the power frequency;

sampling a first voltage signal of the output end of the DC/DC transverter;

extracting a first effective value of an alternating signal comprised in the first voltage signal;

comparing the first effective value with a first preset voltage; and controlling the distributed generator to stop operation, in a case that it is determined that the first effective value is less than the first preset voltage, which indicates that islanding occurs for the distributed generator.

2. The anti-islanding method for a distributed generator in a direct current distribution grid according to claim 1, wherein the direct current distribution grid is a single-end distribution grid or a two-end distribution grid.

3. The anti-islanding method for a distributed generator in a direct current distribution grid according to claim 2, wherein in a case that the direct current distribution grid is the two-end distribution grid, the direct current distribution grid comprises two AC/DC interface transverters, namely a first AC/DC interface transverter and a second AC/DC interface transverter, a first alternating current system is connected to the direct current distribution grid through the first AC/DC interface transverter, and a second alternating current system is connected to the direct current distribution grid through the second AC/DC interface transverter; and the process of feeding an alternating voltage component into the output end of the AC/DC interface transverter comprises:

feeding the alternating voltage component into an output end of any one of the two AC/DC interface transverters, in a case that it is determined that both of the two AC/DC interface transverters operate normally; and feeding the alternating voltage component into an output end of one of the two AC/DC interface transverters which operates normally, in a case that it is determined that one of the two AC/DC interface transverters fails.

4. The anti-islanding method for a distributed generator in a direct current distribution grid according to claim 3, wherein the process of determining that the AC/DC interface transverter fails comprises sampling a second voltage signal of the output end of the AC/DC interface transverter;

extracting a second effective value of an alternating signal comprised in the second voltage signal;

comparing the second effective value with a second preset voltage; and determining that the AC/DC interface transverter fails, in a case that it is determined that the second effective value is less than the second preset voltage.

5. The anti-islanding method for a distributed generator in a direct current distribution grid according to claim 1, wherein the alternating voltage component $u_{ac}^*$ is expressed as $$u_{ac}^* = kU_{dc}\sin(2\pi f_{ac}t),$$

wherein $U_{dc}$ is a rated direct voltage; k is a percentage of the fed alternating voltage component; and $f_{ac}$ is the frequency of the alternating voltage component, wherein k is in a range between 2% and 5% and $f_{ac}$ is in a range between 10% of the power frequency and 60% of the power frequency.

6. The anti-islanding method for a distributed generator in a direct current distribution grid according to claim 4, wherein the first preset voltage is equal to the second preset voltage, as $U_{set}$; and $U_{set}$ is in a range between 5% of $kU_{dc}$ and 20% of $kU_{dc}$.

7. An anti-islanding device for a distributed generator in a direct current distribution grid, wherein the device is applied to a direct current distribution grid, the distributed generator is connected to an input end of a DC/DC transverter, an output end of the DC/DC transverter is connected to the direct current distribution grid through a grid-connected direct current breaker; and an alternating current system is connected to an input end of an AC/DC interface transverter, and an output end of the AC/DC interface transverter is connected to the direct current distribution grid; and the device comprises:

an alternating voltage component feeding unit configured to feed an alternating voltage component into the output end of the AC/DC interface transverter, a frequency of the alternating voltage component being less than the power frequency;

a first voltage signal sampling unit configured to sample a first voltage signal of the output end of the DC/DC transverter;

a first effective value extracting unit configured to extract a first effective value of an alternating signal comprised in the first voltage signal;

a first comparison unit configured to compare the first effective value with a first preset voltage; and a control unit configured to control the distributed generator to stop operation, in a case that it is determined that the first effective value is less than the first preset voltage, which indicates that islanding occurs for the distributed generator.

8. The anti-islanding device for a distributed generator in a direct current distribution grid according to claim 7, wherein the direct current distribution grid is a single-end distribution grid or a two-end distribution grid;

in a case that the direct current distribution grid is the two-end distribution grid, the direct current distribution grid comprises two AC/DC interface transverters, namely a first AC/DC interface transverter and a second AC/DC interface transverter, a first alternating current system is connected to the direct current distribution grid through the first AC/DC interface transverter, and a second alternating current system is connected to the direct current distribution grid through the second AC/DC interface transverter; and the device further comprises a malfunction determination unit;

the alternating voltage component feeding unit feeds the alternating voltage component into an output end of any one of the two AC/DC interface transverters, in a case that the malfunction determination unit determines that both of the two AC/DC interface transverters operate normally; and the alternating voltage component feeding unit feeds the alternating voltage component into an output end of one of the two AC/DC interface transverters which operates normally, in a case that the malfunction determination unit determines that one of the two AC/DC interface transverters fails.

9. The anti-islanding device for a distributed generator in a direct current distribution grid according to claim 8, wherein the malfunction determination unit comprises:

a second voltage signal sampling subunit configured to sample a second voltage signal of the output end of the AC/DC interface transverter;

a second effective value extracting subunit configured to extract a second effective value of an alternating signal comprised in the second voltage signal;

a comparison subunit configured to compare the second effective value with a second preset voltage; and a determination subunit configured to determine that the AC/DC interface transverter fails, in a case that it is determined that the second effective value is less than the second preset voltage.

10. The anti-islanding device for a distributed generator in a direct current distribution grid according to claim 9, wherein the alternating voltage component $u_{ac}^*$ is expressed as $$u_{ac}^* = kU_{dc}\sin(2\pi f_{ac}t),$$

wherein $U_{dc}$ is a rated direct voltage; k is a percentage of the fed alternating voltage component; and $f_{ac}$ is the frequency of the alternating voltage component, wherein k is in a range between 2% and 5% and $f_{ac}$ is in a range between 10% of the power frequency and 60% of the power frequency;

the first preset voltage is equal to the second preset voltage, as $U_{set}$; and $U_{set}$ is in a range between 5% of $kU_{dc}$ and 20% of $kU_{dc}$.

* * * * *